Sept. 15, 1964 R. W. DRAKE ETAL 3,148,719

FEED MECHANISM FOR FRUIT PITTING MACHINE

Original Filed Oct. 22, 1957 8 Sheets-Sheet 1

INVENTORS
ROBERT W. DRAKE
SHERMAN H. CREED

BY Hans G. Hoffmeister

ATTORNEY

FEED MECHANISM FOR FRUIT PITTING MACHINE

Original Filed Oct. 22, 1957

8 Sheets-Sheet 2

INVENTORS
ROBERT W. DRAKE
SHERMAN H. CREED

BY Hans G. Hoffmeister
ATTORNEY

Sept. 15, 1964 R. W. DRAKE ETAL 3,148,719

FEED MECHANISM FOR FRUIT PITTING MACHINE

Original Filed Oct. 22, 1957 8 Sheets-Sheet 3

INVENTORS
ROBERT W. DRAKE
SHERMAN H. CREED

BY

ATTORNEY

Sept. 15, 1964 R. W. DRAKE ETAL 3,148,719

FEED MECHANISM FOR FRUIT PITTING MACHINE

Original Filed Oct. 22, 1957 8 Sheets-Sheet 4

INVENTORS
ROBERT W. DRAKE
SHERMAN H. CREED

BY Hans G. Hoffmeister

ATTORNEY

FEED MECHANISM FOR FRUIT PITTING MACHINE

Original Filed Oct. 22, 1957

INVENTORS
ROBERT W. DRAKE
SHERMAN H. CREED
BY Hans G. Hoffmeister
ATTORNEY

Sept. 15, 1964 R. W. DRAKE ETAL 3,148,719

FEED MECHANISM FOR FRUIT PITTING MACHINE

Original Filed Oct. 22, 1957 8 Sheets-Sheet 6

INVENTORS
ROBERT W. DRAKE
SHERMAN H. CREED

BY Hans G. Hoffmeister

ATTORNEY

Sept. 15, 1964 R. W. DRAKE ETAL 3,148,719

FEED MECHANISM FOR FRUIT PITTING MACHINE

Original Filed Oct. 22, 1957 8 Sheets-Sheet 7

INVENTORS
ROBERT W. DRAKE
SHERMAN H. CREED

BY Hans G. Hoffmeister
ATTORNEY

FEED MECHANISM FOR FRUIT PITTING MACHINE

Original Filed Oct. 22, 1957 8 Sheets-Sheet 8

INVENTORS
ROBERT W. DRAKE
SHERMAN H. CREED

BY Hans G. Hoffmeister
ATTORNEY

United States Patent Office 3,148,719
Patented Sept. 15, 1964

3,148,719
FEED MECHANISM FOR FRUIT PITTING MACHINE

Robert W. Drake and Sherman H. Creed, San Jose, Calif., assignors to FMC Corporation, San Jose, Calif., a corporation of Delaware Original application Oct. 22, 1957, Ser. No. 691,620, now Patent No. 3,035,620, dated May 22, 1962. Divided and this application Sept. 1, 1961, Ser. No. 135,599
9 Claims. (Cl. 146—51)

This application is a division of the application of Drake et al. Serial No. 691,620 filed October 22, 1957, now U.S. Patent No. 3,035,620.

This invention pertains to the preparation of fruit and more particularly relates to an improved apparatus for feeding fruit to a fruit preparation machine.

In one method of pitting peaches, each peach is bisected by a pair of cooperating blades having opposed serrated edges which penetrate the peach and grip the pit. While the pit is held in fixed position, twisting heads engage the peach halves and twist the halves in opposite directions to free them from the pit. The present invention concerns a mechanism for feeding fruit to the cooperating pit-gripping blades while they are disposed in spaced relation.

An object of the present invention is to provide an improved fruit feeding mechanism.

Another object is to provide a novel feed mechanism for feeding peaches to the peach cutting and pit gripping blades of a peach pitting machine.

Other and further objects of the present invention will become apparent from the following description taken in connection with the accompanying drawings, in which.

Figure 1:
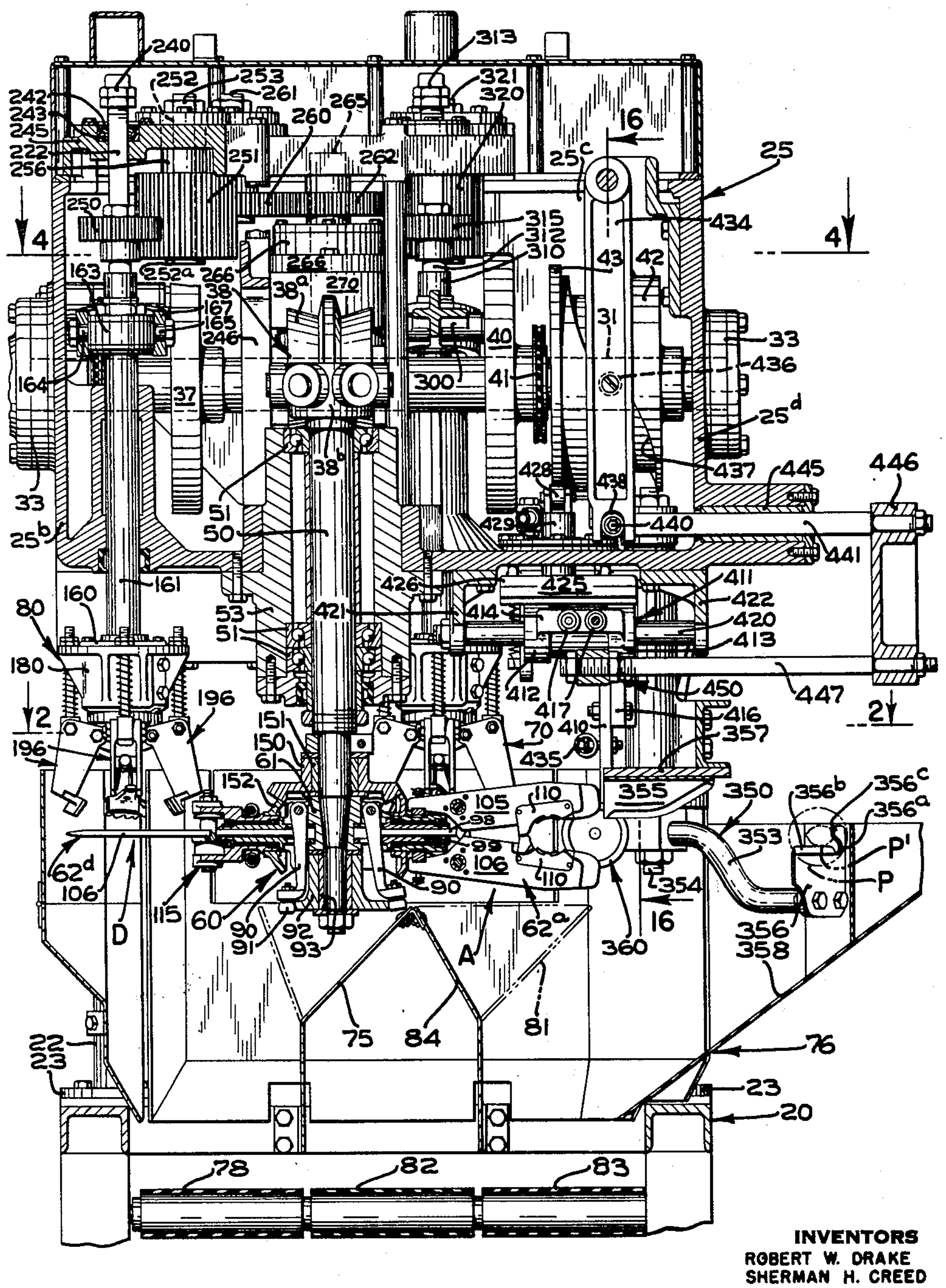
FIG. 1 is a vertical section, with parts broken away, taken centrally through a peach pitting machine incorporating the feed mechanism of the present invention.
Figures 2, 3:
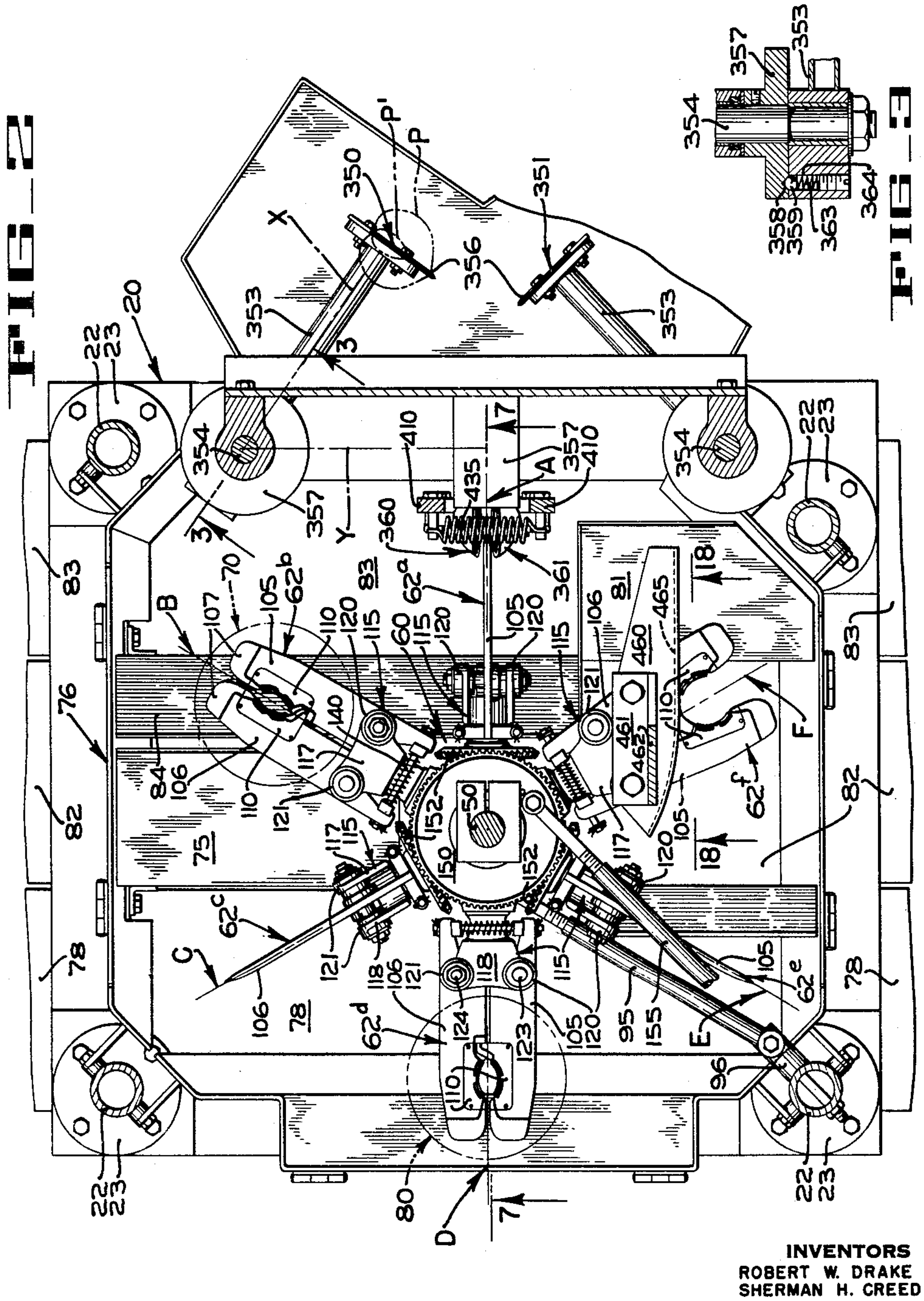
FIG. 2 is an enlarged fragmentary horizontal section taken on line 2—2 of FIG. 1.
FIG. 3 is an enlarged fragmentary vertical section taken on line 3—3 of FIG. 2.
Figures 4, 5:
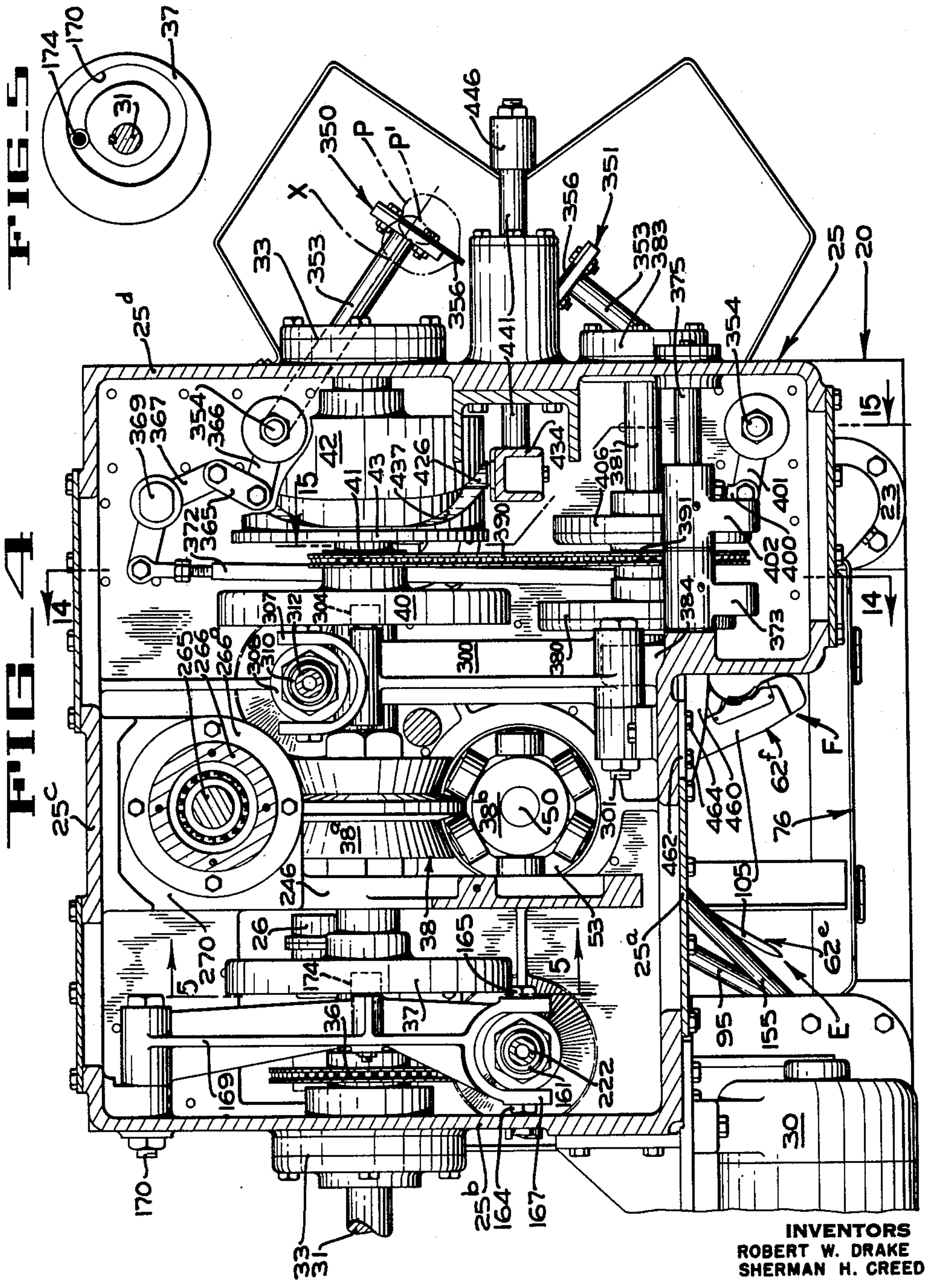
FIG. 4 is an enlarged fragmentary horizontal section taken on line 4—4 of FIG. 1.
FIG. 5 is a reduced vertical section taken on line 5—5 of FIG. 4.

The pitting machine of the present invention is illustrated in FIGS. 1, 2 and 4 as comprising a rigid base 20 having four posts 22 projecting upwardly from the upper surface of the base. Each post 22 has a flange plate 23 (FIG. 2) at its lower end which is bolted to the base 20. The upper end of each post is also provided with a flange plate (not shown) that is bolted to the lower wall of a rigid box-like housing 25 (FIGS. 1 and 4) which has four upstanding side walls 25*a*, 25*b*, 25*c* and 25*d* that form a liquid-tight enclosure. When the machine is in operation, the moving parts of the machine that are disposed in the liquid-tight enclosure, are liberally deluged with lubricating oil, which is stored in the enclosure, by means of a pump 26 that is mounted in the enclosure.

Figure 6:
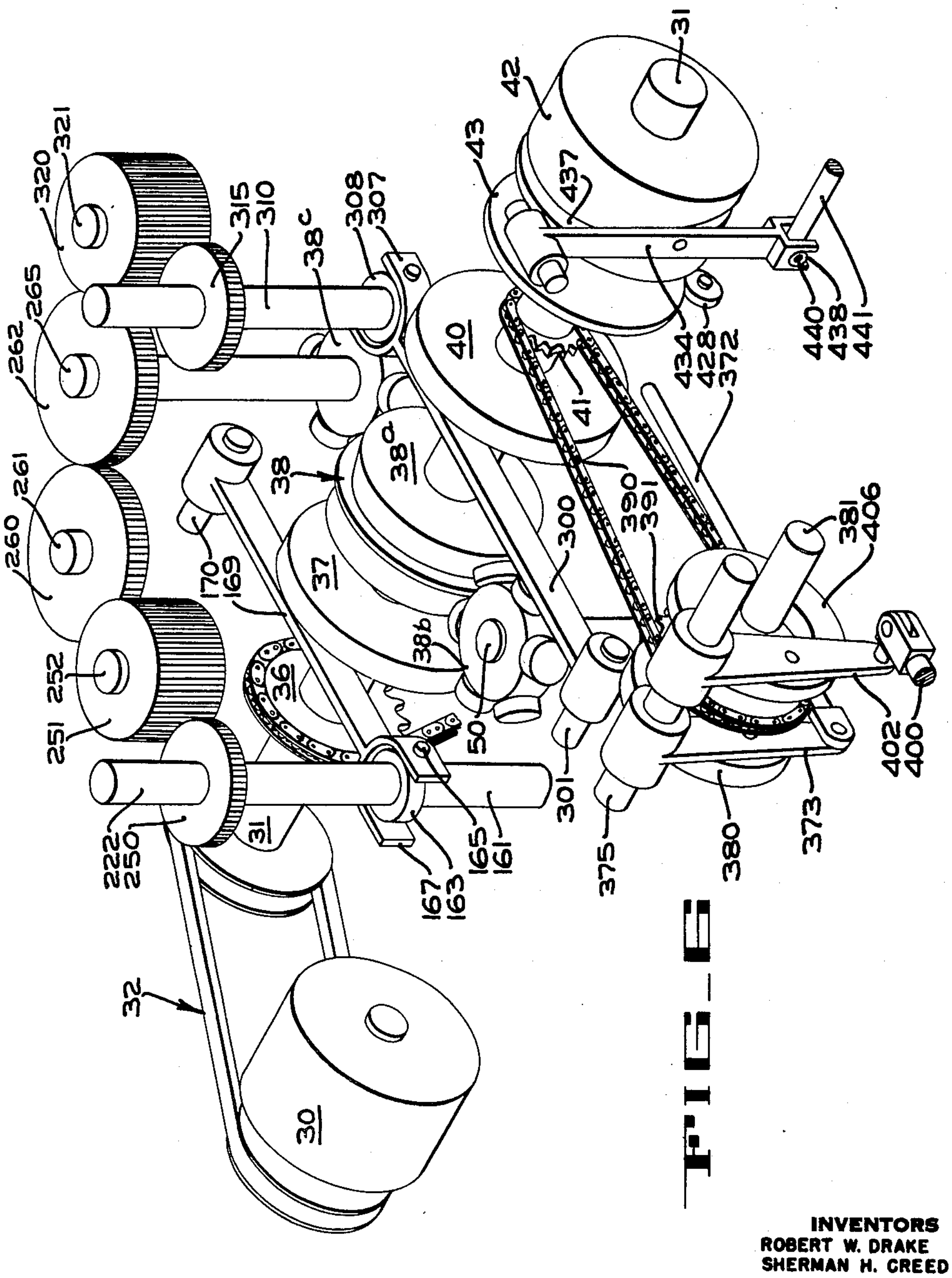
FIG. 6 is a diagrammatic showing of the drive and control mechanism shown in FIG. 1.

Power for driving the machine is obtained from an electric motor 30 (FIGS. 4 and 6) which is mounted exteriorly of the housing, in any suitable manner, and is arranged to rotate a drive shaft 31 through a belt and pulley drive 32. As seen in FIG. 4, the drive shaft 31 passes through the opposite walls 25*b* and 25*d* of the housing and is journalled in a bearing assembly 33 secured to each wall. Keyed on the drive shaft 31 are a pump drive sprocket 36 (FIG. 6), a face cam 37, a drive member 38*a* of a Ferguson drive mechanism 38, a second face cam 40, a second sprocket 41, and a cylindrical cam 42 to which is secured a disc cam 43.

The Ferguson cam or drive member 38*a* is arranged to actuate two driven members 38*b* and 38*c*. The driven member 38*b* is arranged to intermittently index a vertical shaft 50, which is keyed to driven member 38*b*, through 60 degree increments of rotary movement. The vertical shaft 50 is journalled for rotation in bearing assemblies 51 (FIG. 1) disposed in a tubular support member 53 that is secured in an opening in the bottom wall of the housing 25. At its lower end the vertical shaft 50 carries a turret 60 which comprises a hub 61 and six pit-gripping blade assemblies 62*a* to 62*f* inclusive (FIG. 2). As the turret shaft 50 is intermittently rotated, each blade assembly is moved in a counterclockwise rotary path (FIG. 2) to six successive stations, indicated by reference letters, A, B, C, D, E, and F, which are disposed at 60 degree intervals. At station A, a peach is moved onto a blade assembly when the blades are disposed in a vertical plane and are in an open, peach-receiving position. The next indexing movement of the turret causes the blade assembly to be moved to station B and, during this movement, the blades are moved to a closed position to cut into and through the meat of the peach all the way to the pit, which is then firmly gripped by the blades. Also, during this first indexing movement, the blades are rotated about a horizontal axis from the vertical position of station A to a horizontal position.

A twisting head 70, shown in FIG. 1 and indicated in phantom lines in FIG. 2, is mounted directly above station B of the turret. While the blade assembly with the peach thereon dwells at station B, the twisting head 70 is moved downwardly, in a manner to be explained presently, to engage and grip the half of the peach on the upper surface of the horizontal blade assembly. When the twisting head has gripped the peach, the head is rotated about a vertical axis causing the peach half to be twisted from the stationary pit. After the peach half is free from the pit, the gripper head is caused to release the peach half and allow it to remain on the upper surface of the blade assembly.

During the next indexing movement of the turret, the blade is rotated to a vertical position at station C (FIG. 2) and, during this rotary movement, the loose peach half is dropped onto a slanted plate 75 which is disposed below the path of movement of the blade assemblies. The slanted plate 75, which is supported from the base 20, is disposed within a rigid housing 76 that also encloses the turret. The peach half that drops on the slanted plate 75 is directed downwardly onto a belt conveyor 78 which conveys the pitted halves to a subsequent processing station in the cannery.

Next, the blade assembly with the pit and the remaining peach half are indexed to station D and the blade is rotated to a horizontal position with the remaining peach half disposed on the blade surface that is facing upwardly. A second twisting head 80 (FIGS. 1 and 2), which is mounted above the blade assembly at station D, is moved downwardly to grip the peach half and twist it free from the pit. Then, as the blade assembly is indexed to station E, the second half of the peach is dropped onto the conveyor 78. During the movement of the blade assembly from station E to station F, the blade assembly is rotated and the blades are moved to the open position, shown in FIG. 2, at station F causing the pit to drop directly onto a pit conveyor 82 or to be guided onto the conveyor by a slanted wall 81. The next indexing movement of the turret returns the blade assembly to the vertical open, peach-receiving position at station A.

Referring again to station B, it will be noted that, if the peach has a split pit, the peach half on the undersurface of the blades will drop downwardly when the upper half is twisted by the twisting head 70. The lower peach half drops directly onto a conveyor 83 or is guided toward the conveyor 83 by a slanted wall 84.

Accordingly, one of the features of the present machine is its ability to make a three way separation of parts of the peach; since peach halves having split pits are directed to conveyor 83, properly pitted peach halves are directed to conveyor 78, and pits are taken away on conveyor 82.

Figure 8:
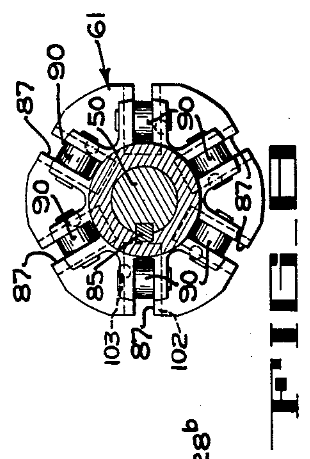
FIG. 8 is a horizontal section taken on lines 8—8 of FIG. 7.
Figures 7, 9:
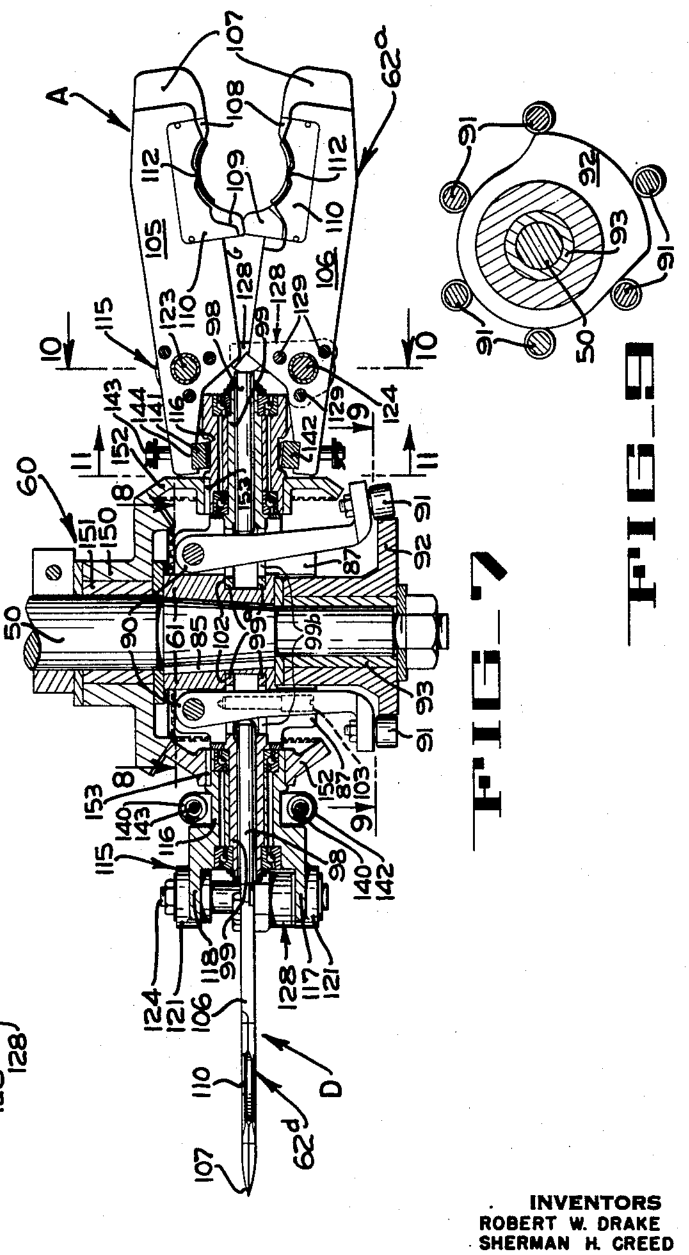
FIG. 7 is a vertical section taken with parts in elevation taken substantially on line 7—7 of FIG. 2.
FIG. 9 is a horizontal section taken on lines 9—9 of FIG. 7.

The turret 60 is connected to the turret shaft 50 by means of a key 85 (FIG. 7) disposed in adjacent slots in the hub 61 and in the shaft 50. The hub 61 is a generally cylindrical member having six longitudinal, vertically disposed slots 87 (FIGS. 7 and 8). The slots are spaced equi-angularly around the hub 61, one slot being associated with each blade assembly. A lever 90 is pivotally mounted in each slot 87 and carries, at its lower end, a follower roller 91 that rides on the peripheral camming surface of a cam 92 that is freely journalled on a sleeve 93 disposed on the turret shaft 50. The free rotation of the cam 92 relative to the shaft permits the cam to be held in fixed position, during rotation of the shaft, by an anchoring tie bar 95 (FIG. 2) extending between the cam 92 and a connector 96 secured to one of the support posts 22.

The camming surface of the cam 92, which is shown in FIG. 9, is so designed that each lever 90 is swung outwardly to contact a push rod 98 (FIG. 7) slidably journalled in a tubular pivot shaft 99 which projects radially outwardly from the hub 61. Each pivot shaft 99 has a slot 99*b* which receives the lever 90 and an inner extension 99*a* locked in a cylindrical socket 102 of the hub 61 by a stud 103. Each blade assembly 62*a* through 62*f* includes two blades 105 and 106 of the type described in detail in the pending application of Paul C. Wilbur, Serial No. 686,171, now U.S. Patent No. 2,954,063, which is assigned to the assignee of the present application. In general, each blade is a flat elongated member having a sharpened outer edge 107 and sharpened edges 108 and 109 formed in a pit gripping insert 110. A plurality of metal prongs 112 project along the concave edge of the insert 110 and these prongs are adapted to grip the pit of the peach. It will be understood that when the blades 105 and 106 are disposed in the open position shown at the right side of FIG. 7, a peach that is moved radially inwardly of the turret and into engagement with the blades will be split by the cutting edges 107, 108 and 109 of the blades. Then when the blades are moved toward each other to their closed position, the pit gripping inserts 110 will cooperate to grip the pit and hold it in fixed position until the blades are opened again. It should be noted that, if the peach has a weak or split pit, the contact of the closing blades will break the pit and cause the severed peach halves to drop downawrdly onto split pit conveyor 83.

Figure 10:
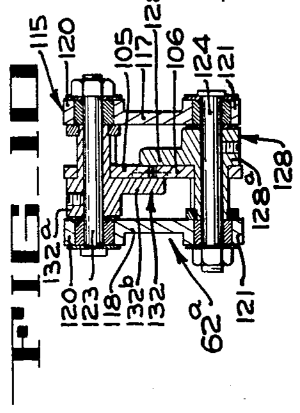
FIG. 10 is a vertical section taken on lines 10—10 of FIG. 7.

As shown in connection with blade assembly 62*d* in FIG. 7, each blade assembly has a blade carier 115 provided with a generally tubular body portion 116 supported on bearing assemblies disposed around the tubular pivot shaft 99. The carrier 115 has two wing portions 117 and 118, each of which has two spaced hubs 120 and 121 (FIG. 10). The two hubs 120 support a shaft 123, and the two hubs 121 support a shaft 124. The blade 106 is mounted on a hub 128*a* of an actuator arm 128 that is keyed to the shaft 124 and has an inner end portion 128*b*, shown in connection with blade assembly 62*a* in FIG. 7, that is arranged to be contacted by the associated push rod 98. The actuator arm 128 is secured to the blade 106 by three capscrews 129. It will be evident that, when the push rod 98 moves radially outwardly, it pivots the actuator arm 128 and the attached blade 106 toward the open position of the blade assembly. Similarly the blade 105 is mounted on a hub 132*a* (FIG. 10) of an actuator arm 132 that is secured to the blade 105 and has an inner end 132*b* arranged to be engaged by the push rod 98. As seen in FIG. 10 the inner end portions 132*b* and 128*b* are disposed close to each other so that they can be actuated simultaneously by the push rod.

Figure 11:
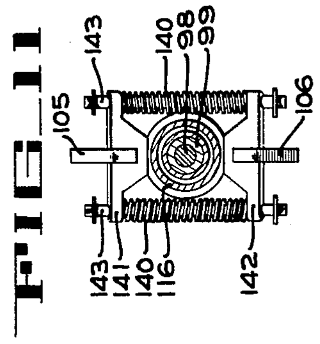
FIG. 11 is a vertical section taken on line 11—11 of FIG. 7.

The blades 105 and 106 are urged toward closed position by two springs 140 (FIG. 11) that are disposed between two transverse bars 141 and 142. A rod 143 which projects between the bars 141 and 142 maintains each spring in position between the bars. The bar 141 is disposed in a groove 144 (FIG. 7) in the inner end of the blade 105, and the bar 142 is disposed in a groove in the inner end of the blade 106. When the blades are pivoted to open position by the push rod 98, the springs 140 are compressed and, accordingly, are ready to move the blades to closed position when the push rod is permitted to swing inwardly.

Each blade assembly is rotated about the tubular pivot shaft 99, during each indexing movement of the turret 60, by means of a bevel gear 150 (FIG. 7) that is freely journalled on a bearing sleeve 151 that encircles the vertical turret shaft 50. The gear 150 is in mesh with six gears 152 (two only being shown in FIG. 7), one gear 152 being keyed to the blade carrier 115 of each blade assembly by a key 153. The bevel gear 150 is held in fixed, non-rotating position by a tie-bar 155 (FIG. 2) that is secured at one end to the upper surface of the gear 150 and, at the other end, is secured to a post 22 by a connector (not shown) that is identical to the connector 96 which secures tie bar 95 to the post 22. Thus, as the blade assemblies are carried bodily in a circular path by the hub 61, each blade assembly is rotated, due to the engagement of the associated gear 152 with the fixed gear 150, about the axis of the tubular pivot shaft 99, which axis will be referred to as the axis of the blade assembly.

The twisting head 80 (FIG. 1) has a top plate 160 to which is welded an upwardly projecting lifter tube 161. Near its upper end the lifter tube 161 carries a ring 163 in which diametrically opposite pivot pins 164 and 165 are secured. These pivot pins receive the arms of a yoke 167 (FIG. 4) formed on one end of a lever 169 that is pivotally mounted at the other end on a bolt 170 secured to the wall 25*b* of the housing 25. A follower roller 174 is pivotally mounted on the lever 169 intermediate its ends and is arranged to ride in the camming groove 170 (FIG. 5) of the previously mentioned face cam 37. It will be apparent that the continuously rotating drive shaft 31 periodically raises and lowers the lifter tube 161 and the head 80 attached thereto.

Figure 13:
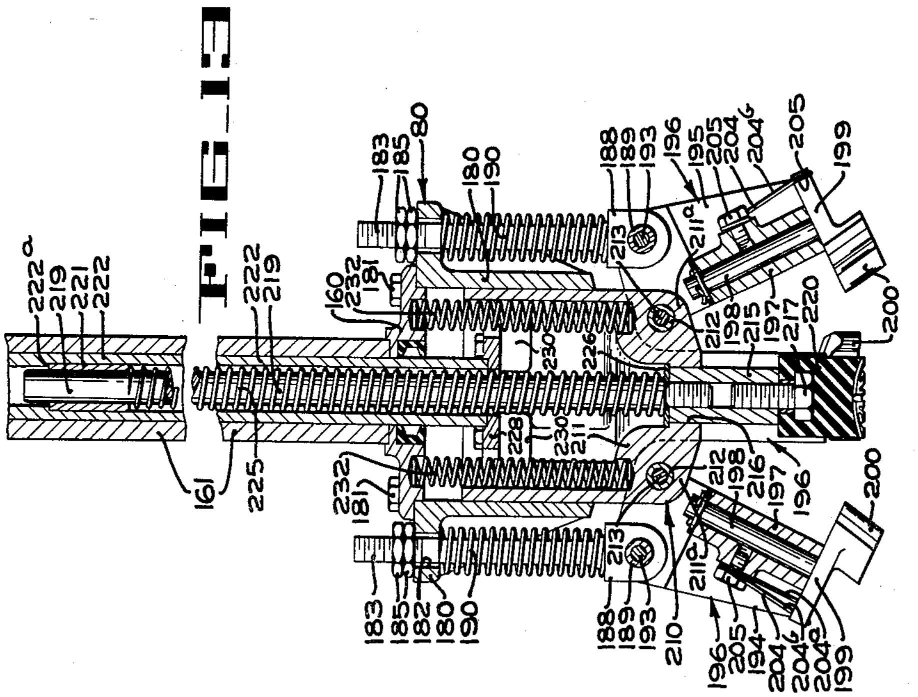
FIG. 13 is an enlarged fragmentary section taken centrally through the head of FIG. 12.

The twisting head 80 comprises an outer cylinder 180 (FIGS. 12 and 13) to which the cover plate 160 is secured by capscrews 181. The cylinder 180 has four openings 182 (two only being shown in FIG. 13) that are disposed at 90 degree intervals around the upper flanged end of the cylinder. A rod 183 projects through each opening 182 and each rod has a threaded upper end on which lock nuts 185 are disposed. The rod 183 is provided at its lower end with a block 188 which has a transverse opening fitted with a bushing 189. A spring 190 is disposed around each rod 183 between the block 188 and the upper flanged end of the cylinder. A capscrew 193 extends through the bushing 189 and through aligned openings 194*a* and 195*a* (FIG. 12) in two spaced arms 194 and 195, respectively, of a pad-support lever 196 so that the lever 196 is pivotally mounted on the lower end of the associated rod 183. Each pad-support lever 196 has a transverse, body portion 197 (FIG. 13) which is integrally formed with the arms 194 and 195, and has an opening arranged to receive a pin 198 which is riveted to a finger 199 on which a rubber facing 200 is molded. The facing 200 has a concave peach contacting surface that has a wavy or corrugated configuration. A torsion spring 204 is looped around a capscrew 205 threaded into the transverse body portion 197 and has one leg 204*a* (FIG. 12) abutting the inner surface of arm 194 and the other leg 204*b* disposed in hooked engagement in a slot 205 formed at the outer end of the finger 199. The torsion spring 204 rotates the associated finger about the axis of the pin 198 to a slightly turned position, illustrated by the center finger of FIG. 12, wherein one side edge of the concave facing 200 is disposed further away from the vertical axis of the head than the other. At the beginning of a twisting operation the springs move the fingers into gripping engagement with the surface of the peach.

The twisting head 80 also has an inner cylinder 210 (FIG. 13) which is slidably disposed in the outer cylinder 180 and has a bottom wall 211 with four equally spaced flanges 211*a* formed thereon (two only being shown). Each flange 211*a* has an opening in which is disposed a bushing 212 adapted to receive a capscrew 213, which also projects through openings (not shown) in the arms 194 and 195 to pivotally mount the pad-support lever 196 on the inner cylinder. A short internally threaded tube 215 is slidably mounted in a central opening 216 in the bottom wall 211. A rubber pad 220 is supported from the lower end of the tube 215 by a capscrew 217, and a rod 219 is threaded in the upper end of the tube to project upwardly therefrom. At its upper end the rod 219 is slidably journalled in a bushing 221 that is disposed against a shoulder 222*a* of an inner tubular twister shaft 222. A spring 225 is disposed around the rod 219 between the bushing 221 and a washer 226 which lies on the upper end of the short tube 215. At its lower end the inner tubular shaft 222 is secured, as by welding, to a transverse plate 228 that is bolted to four tabs 230 (two only being shown in FIG. 13) that project inwardly from the surface of the inner cylinder 210. Four compression springs 232 (two only being shown) are disposed between the lower wall 211 of the cylinder 210 and the cover plate 160.

To prevent rotation of the inner cylinder 210 relative to the outer cylinder 180, two capscrews 235 (FIG. 12) are threaded through tapped openings in the wall of the outer cylinder 180 and into a key 236 that is disposed in a slot 237 in the outer cylinder and in a slot 238 in the inner cylinder. A second pair of capscrews (not shown) are disposed diametrically opposite the capscrews 235 to lock a similar key between the inner and outer cylinders.

When the lifter tube 161 is lowered during the operation of the machine, the rubber pad 220 engages the upper surface of the peach. The sliding engagement of the short sleeve 215 in the wall 211 permits the inner cylinder 210 to move downwardly causing the spring 225 to be compressed to resiliently load the pad 220. The inner cylinder is moved downwardly until a lock nut 240 (FIG. 1), threaded on the upper end of the inner tubular shaft 222, engages a rubber stop member 242 secured on a thrust bearing 243 on a support casting 245 which extends across a portion of the upper end of the housing 25. The casting 245 is bolted to the top of the side walls of the housing and to a central partition 246 of the housing. Engagement of lock nut 240 with the stop member 242 stops the downward movement of the inner cylinder 210 (FIG. 12), and then further downward movement of the outer cylinder causes the outer cylinder to slide downwardly relative to the inner cylinder. The springs 232 are compressed and a force is transmitted through the four springs 190 tending to pivot the pad-support levers 196 inwardly so that the pads engage the outer surface of the peach half. After the twisting operation, which will be explained presently, the lifter tube 161 is moved upwardly causing the four rods 183 to first pivot the pad-support levers 196 outwardly away from the peach and then, acting through the levers 196 and capscrews 213, move the inner cylinder 210 upwardly.

Figure 12:
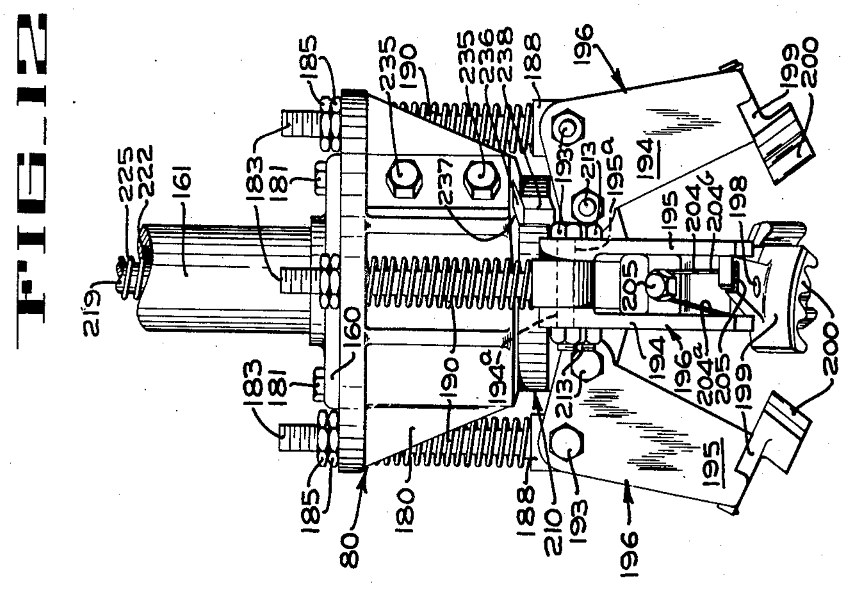
FIG. 12 is an enlarged elevation of one of the twisting heads used in the machine of FIG. 1.

The twister head 80 is rotated, to twist the peach half off the pit, by means of a gear 250 (FIGS. 1 and 6) that is keyed on the inner tubular twister shaft 222. The gear 250 is in mesh with a first idler gear 251 which is rotatably mounted on a shaft 252 that has a head 252*a* at its lower end and is threaded at its upper end to receive a nut 253. The shaft 252 is locked in a flanged sleeve 256 (FIG. 1) which is disposed in an opening in the support casting 245. A second idler gear 260, which meshes with the first idler gear 251, is supported on a shaft 261 from the support casting 245 in exactly the same manner as the first idler gear is supported. A drive gear 262 (FIGS. 1 and 6), which meshes with gear 260, is keyed to a vertical shaft 265 that is rotatably journalled in a bearing retainer sleeve 266. The sleeve 266 is best shown in FIG. 4 wherein it will be noted that an upper circular flange 266*a* of the sleeve is bolted to a horizontal platform 270 which is formed integral with the wall 25*c* and the partition 246 of the base 25. The second Ferguson driven member 38*c* (FIG. 6) is keyed to the lower end of the vertical shaft 265. Thus, during operation, the Ferguson drive intermittently rotates the vertical shaft 265 which in turn intermittently rotates the inner tubular shaft 222 of the twister head 80 through the gears 262, 260, 251 and 250. Referring again to FIG. 13, the inner shaft 222 rotates the inner cylinder 210, which in turn drives the outer cylinder 180 through the keys 236 (FIG. 12).

Figures 14, 15:
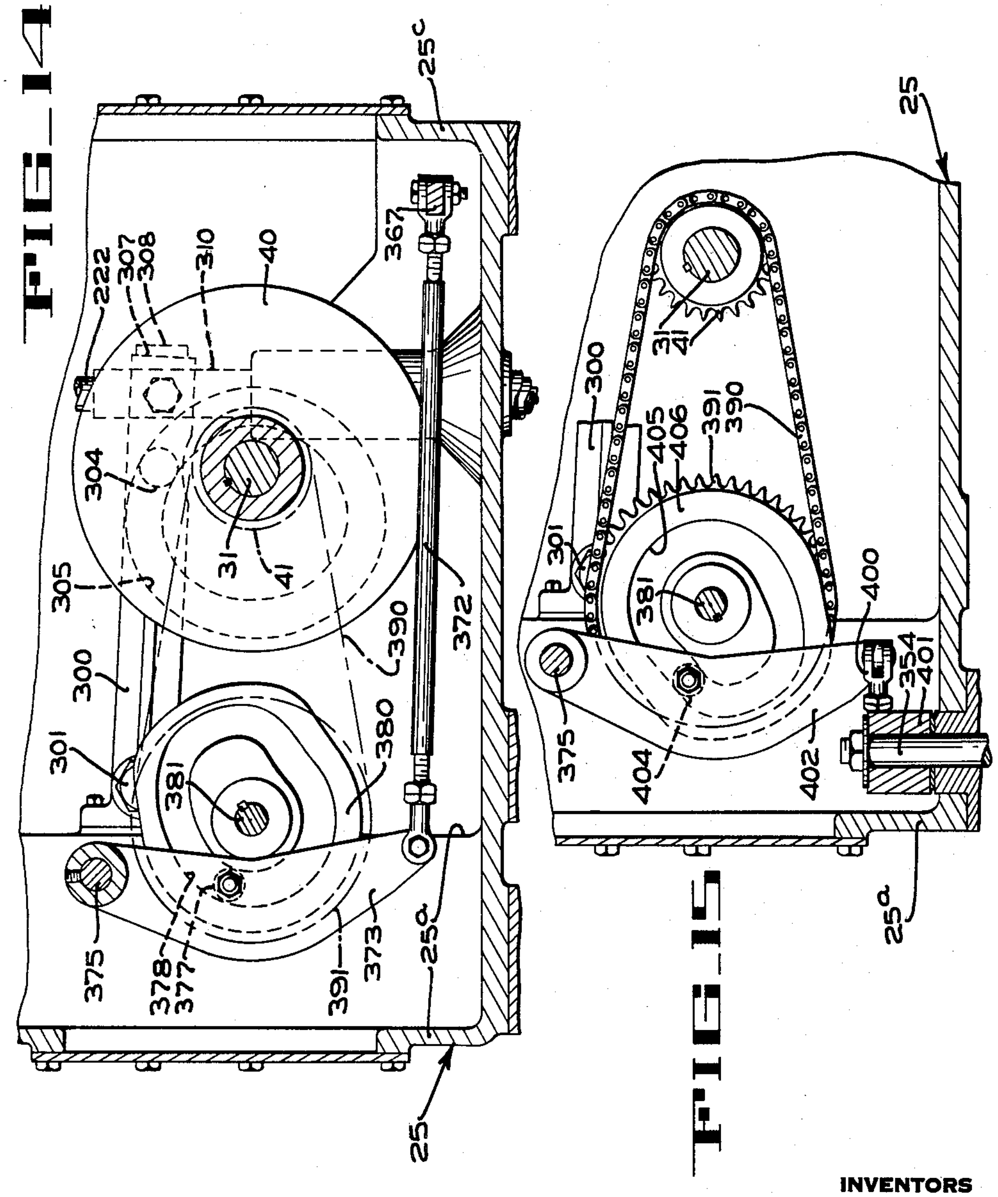
FIG. 14 is a fragmentary enlarged vertical section taken on lines 14—14 of FIG. 4.
FIG. 15 is an enlarged vertical section taken on line 15—15 of FIG. 4.

The other twister head 70 is identical to the twister head 80. Also, the head 70 is raised and lowered in an identical manner by means of a lever 300 (FIGS. 4 and 14) that is pivoted from wall 25*a* by a bolt 301. Intermediate its length, the lever 300 carries a roller 304 that rides in a camming groove 305 in the face cam 40 which, as previously mentioned, is also keyed to drive shaft 31. At its free end, the lever 300 carries a yoke 307 which is pivotally connected to a ring 308 keyed to an outer cylinder shaft 310 of the twister head 70. An inner tubular shaft 312 (FIG. 1) is provided with lock nuts 313 and has a gear 315 keyed thereon. The outer shaft 310 and the inner shaft 312 of the head 70 are identical in construction and operation to the outer shaft 161 and the inner shaft 222, respectively, of the head 80. Accordingly, a detailed description of the construction and operation of the head 70 will not be necessary. It will be noted in FIGS. 1 and 6 that the head 70 is twisted by the drive gear 262, that is keyed to the Ferguson drive shaft 265, through an idler gear 320. This idler gear 320 is supported from casting 245 on a shaft 321 in the same manner that the idler gears 251 and 260 are mounted.

Figures 16, 17, 18, 19:
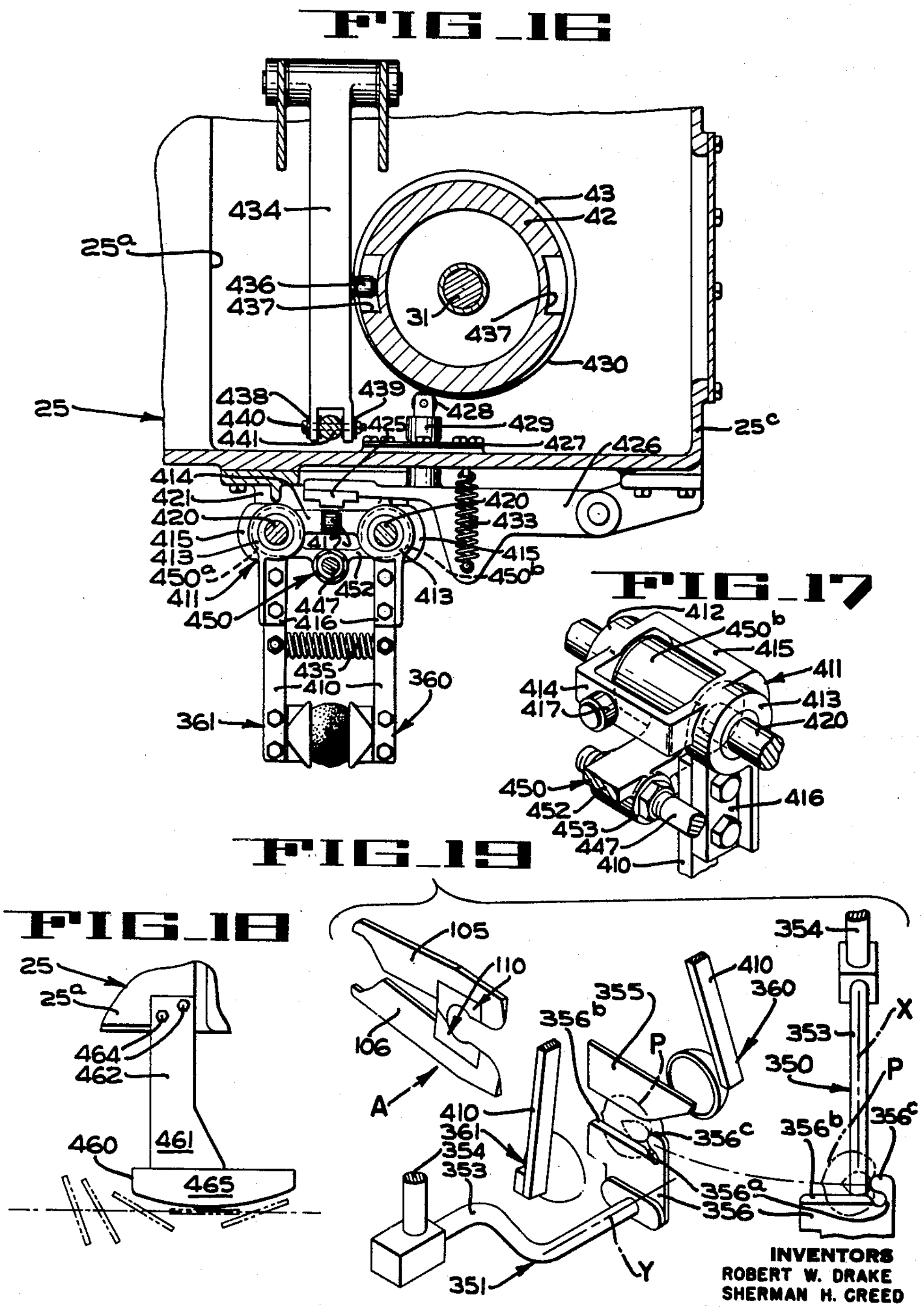
FIG. 16 is a fragmentary section taken on line 16—16 of FIG. 1.
FIG. 17 is an enlarged fragmentary perspective view of a portion of FIG. 16.
FIG. 18 is a reduced vertical section taken on line 18—18 of FIG. 2.
FIG. 19 is a schematic view of the feed mechanism used in the present machine.

As shown schematically in FIG. 19, peaches are fed to an open blade assembly at the feed station A by means of two feed members 350 and 351 each of which has a support arm 353 arranged to be oscillated by vertical rotatable shaft 354. Each feed member is movable from a position X at which a flat blade 356 mounted on the member receives a peach, to a position Y where the peach is impaled on a fixed blade 355, which is mounted on a fixed frame member 357 (FIG. 1) in coplanar relation with the blade assembly at feed station A and with the flat blade 356. Each blade 356 has a recess *356a* disposed between a sharpened longitudinal edge *356b* and a locating head or projection *356c*. To position the peach on the feed member, the operator grasps the peach with both hands, adjusts the peach until its suture plane is vertical, and impales the peach on the blade 356 when it is momentarily stopped at position X. When the projection *356c* has entered the stem end of the peach, the operator imparts a downward pivoting movement to the peach, causing it to be firmly impaled on the blade with the pit abutting the projection *356c* and the sharpened edge *356b*. If the peach has a particularly weak split pit, the pit may shatter as it is brought into contact with the blade 356. In this case the peach will be cut in halves as it is moved downwardly on the blade 356 and the halves will drop onto a slanted bottom wall 358 of the enclosure 76 and be directed onto the split pit conveyor 83.

After one of the feed members has impaled a peach on the fixed blade 355 at position Y, a pair of transfer cups 360 and 361 are moved inwardly from opposite sides of the blade 355 to engage the peach. When the peach is engaged, the cups are moved as a unit radially inwardly of the turret to remove the peach from the fixed blade 355 and position it between the open blades 105 and 106 of the blade assembly that is at the feed station A of the turret at this time.

The feed member 350 (FIG. 2) is moved from position X to position Y by rotation of the associated shaft 354. As seen in FIG. 3, the support arm 353 has a hub freely journalled on the shaft 354. A flanged hub 357 is keyed to the shaft 354 and has a socket 358 arranged to receive a ball 359 that is urged upwardly by a spring 363 mounted in a socket 364 in the hub of support arm 353. Under normal conditions, the hub 357 will drive the arm 353 through the ball 359. However, if the operator wishes to stop the movement of arm 353, a holding pressure exerted on the arm will cause the ball 359 to be cammed out of the socket 358. Rotation of shaft 354 is effected by a link 365 (FIG. 4) that is pivotally connected between an arm 366 that is keyed to shaft 354, and an arm of a bellcrank 367 which is pivotally mounted on a fixed vertical post 369. A tie rod 372 is pivoted at one end to the other arm of bellcrank 367 and, at its other end, is pivoted to a follower support arm 373 (FIG. 14) that is keyed on a shaft 375 (FIG. 4) that is rotatably mounted in wall portions of the housing 25. The follower support arm 373 carries a roller 377 (FIG. 14) that rides in a camming groove 378 of a face cam 380. The cam 380 is keyed to a shaft 381 which, as seen in FIG. 4, is rotatably mounted at one end in a bearing assembly 383 secured to wall *25d* and at the other end in a boss 384 projecting inwardly from the wall *25a*. A chain 390 is trained around a sprocket 391 keyed to shaft 381 and around the sprocket 41 keyed to drive shaft 31. It will therefore be evident that as the drive shaft 31 rotates, it rotates the face cam 380 causing the support arm 353 of feed member 350 to be oscillated to move the feed member 350 between peach receiving position X to peach impaling position Y.

Similarly, the feed member 351 (FIG. 4) is moved between positions X and Y by a link 400 pivotally connected to an arm 401 that is keyed to the shaft 354 to which the support arm 353 of feed member 351 is connected by a spring-loaded ball and socket drive, identical to the drive shown in FIG. 3. A cam follower support arm 402 (FIG. 15) is pivotally connected to link 400 and is keyed at its upper end to the rotatable shaft 375 which also carries the follower arm 373. A roller 404 which is mounted on arm 402 intermediate its length, is arranged to ride in a camming groove 405 of a face cam 406 that is keyed to the shaft 381 which is driven by chain 390. Since both of the face cams 380 and 406 are driven by shaft 381, it is evident that the feed members 350 and 351 are oscillated in timed relation. The cams 380 and 406 are so designed that, although the feed members are actuated successively, each feed member is held in position X until the other feed member has impaled a peach on the fixed blade 355 and returned to its position X.

Each of the transfer cups 360 and 361, which carry the peach from the fixed blade 355 to the open blades of the blade assembly at feed station A, is mounted on the lower end of a bar 410 (FIG. 16). At its upper end each bar 410 is bolted to a support member 411 (FIG. 17) that comprises two spaced bosses 412 and 413 connected by a front strap 414 and a rear strap 415. An arm 416 extends downwardly from boss 413 to receive the associated bar 410 in bolted relation. A rotatable roller 417 is connected on the strap 414 of each support member 411. A rod 420 (FIG. 1), that is fixed in two spaced brackets 421 and 422 supported from the lower wall of the housing 25, projects through the spaced bosses 412 and 413 of each support member 411 to support the member 411 for pivoting movement.

The two rollers 417 are disposed adjacent each other in the path of downward movement of an actuator plate 425 (FIGS. 1 and 16) carried on a pivotally mounted lever 426. A cam follower roller 428 (FIG. 16) is mounted on an arm 429 projecting upwardly from lever 426 through an opening in the bottom wall of the housing. This opening is sealed by a flexible membrane 427 that is bolted to the wall. The roller 428 rides along a camming surface 430 of the disc cam 43 which is secured to the cylindrical cam 42 that is keyed on drive shaft 31. When the roller follower 428 is moved downwardly by the camming surface 430, the lever 426 is swung downwardly causing the actuator plate 425 to engage the two rollers 417 and swing the cups 360 and 361 outwardly away from each other. A spring 433, which is connected between the lever 426 and the housing 25, urges the lever 426 upwardly so that the lever is periodically swung upwardly, under the control of the camming surface 430, to move the actuator plate 425 away from the rollers 417 and permit a spring 435, connected between the bars 410, to swing the cups 360 and 361 into gripping engagement with a peach impaled on the fixed blade 355.

The cups 360 and 361 are reciprocated toward and away from the blade assembly at feed station A by means of the cylindrical cam 42 which is arranged to oscillate a lever 434 (FIGS. 1 and 16) that has a roller 436 disposed in a camming groove 437. The lever 434 has a forked lower end disposed around two rollers 438 and 439 rotatably mounted on a bolt 440 extending through a rod 441. The rod 441, which is slidably disposed in a sleeve 445 (FIG. 1) in the wall *25d*, has one end fixed in a plate 446 that also carries a lower rod 447 in parallel fixed relation to rod 441. A pusher unit 450 (FIGS. 16 and 17) is fixed to the inner end of the lower rod 447, and this pusher unit comprises a pair of spaced hubs *450a* and *450b* connected by straps 452 to a central hub 453 which receives the lower rod 447. As seen in FIG. 17, the hub *450b* is disposed around rod 420 between the spaced bosses 412 and 413 of the cup support member 411. The hub *450a* is similarly disposed between the bosses of the associated support member 411. Referring to FIG. 1 it will be evident that, when the cylindrical cam 42 is rotated, the lever 434 moves the parallel rods 441 and 447 radially inwardly or outwardly of the turret to move the transfer cups 360 and 361 toward or away from the blades of the blade assembly at feed station A. The rods 441 and 447 and plate 446 thus act as an actuating linkage for the transfer cups.

As previously mentioned, as the blade assembly leaves station E (FIG. 2) the blades are moved to open position to permit the pit to drop onto pit conveyor 82. If the pit adheres to one of the blades, it will be forced off the blades by a stationary ejector or scraper member 460 which is mounted above station F. The ejector member 460 is bolted to a bracket 461 that has an upstanding arm 462 secured to the wall 25*a* by bolts 464 (FIG. 4). The member 460 has a depending blade 465 which, as seen in FIG. 18, has a lower edge that is curved to permit the rotating blade assembly to move past the ejector blade 465 in closely spaced relation. Several positions of the rotating blades are shown in phantom lines in FIG. 18. Referring again to FIG. 2, it will be seen that a pit carried on either blade will come into contact with the depending ejector blade 465 just before the blades come to rest at station F or immediately upon leaving station F. It will be evident that if, for some reason a whole peach reaches station E without being pitted, the blade 465 will force it off the blade and cause it to drop onto the pit conveyor 82.

To put the machine into operation, the electric motor 30 (FIG. 6) is energized causing it to rotate the drive shaft 31. As the shaft 31 is continuously rotated, the twisting head lift cams 37 and 40 are rotated, as also are the Ferguson drive member 38*a*, the disc cam 43 which controls the movement of the transfer cups 360 and 361 radially of the turret.

In summarizing the operation of the machine, the progress of a single peach as it is moved through the machine will be followed with particular reference to FIGS. 1, 2 and 4. The peach P is positioned on the blade 356 of feed member 350 (FIG. 2) when it is momentarily held stationary at position X. The peach is so impaled on the blade that the suture plane of the peach is substantially in the plane of the blade and the pit of the peach is disposed with its long axis generally horizontal and substantially in the plane of the blade. As the drive shaft 31 rotates, the disc cam 380 (FIG. 4) is rotated to actuate the tie rod 372 and the associated linkage to swing the feed member 350 to position Y to impale the peach on the fixed vertical blade 355. When the peach is thus impaled, the disc cam 43 permits the roller 428 (FIG. 1) to move upwardly and allows the spring 435 (FIG. 2) to swing the cups 360 and 361 into gripping engagement with the peach. When the peach is firmly engaged, the cylindrical cam 42 (FIG. 1) swings the lever 434 in a direction to cause the pusher unit 450 to slide the cup support members 411 radially inwardly of the turret to remove the peach from the fixed blade 355 and impale it on the blades 105 and 106 that are held in open position at feed station A of the turret.

After the peach has been impaled on the open blades 105 and 106, the disc cam 43 (FIG. 1) forces the roller 428 downwardly, causing the actuator plate 425 to engage the rollers 417 and swing the transfer cups 360 and 361 away from the peach. The cam 42 then swings lever 434 in a direction to move the transfer cups radially outwardly of the turret to their initial position adjacent the fixed blade 355. The Ferguson drive 38 then indexes the turret to move the blade assembly to station B. During this movement, the cam 92 at the lower end of the turret shaft 50 permits the lever 90 to swing radially inwardly, allowing the springs 140 (FIG. 2) to move the blades toward each other to cut into the peach and grip the pit.

As the blade assembly moves to station B, the gear 152 (FIG. 2) associated with the blade assembly rolls along the fixed bevel gear 150 and effects a 90° rotation of the blade assembly about the longitudinal axis of the pivot tube 99 (FIG. 1) to move the blades to a horizontal position. The direction of rotation of the blade assembly is such that the blade 105, which is uppermost at station A, is trailing the blade 106 at station B, as shown in FIG. 2. When the blades have come to rest at station B, the face cam 40 (FIG. 1) lowers the twisting head 70 into gripping engagement with the peach half projecting upwardly from the blade assembly. The Ferguson drive then rotates the twisting head to twist the peach half free from the stationary pit. The twisting head is then raised by cam 40, releasing the peach half which remains on the blades.

The turret is again indexed to move the blade assembly to station C. During the movement toward station C, the blade assembly is again rotated 90° about its longitudinal axis. This 90° rotation moves the blade 106 (FIG. 2) upwardly and the blade 105 downwardly, causing the peach half to slide or tumble off the blades and be directed by the inclined wall 75 onto conveyor 78.

When the turret is next indexed to station D, the blade assembly is again rotated 90° about its axis to bring the remaining peach half into position below the twisting head 80. The cam 37 lowers the head 80 into gripping engagement with the remaining peach half, and the Ferguson drive rotates the head 80 to free the peach half from the pit. When the peach half is free from the pit, the head is moved upwardly causing it to release the peach half. Then, as the blade assembly is moved to station E, it is again rotated 90°, causing the peach half to drop downwardly onto conveyor 78.

When the blade assembly is rotated 90°, as it is moved to station F, the blades 105 and 106 are moved to open position by the associated push rod 98 which is moved outwardly at this time by the cam 92. Accordingly, the pit is released and dropped onto the pit conveyor 82. If the pit clings to one of the blades, it is cammed off the blade by the stationary ejector member 460. During the next indexing movement of the turret, the blade assembly is rotated to vertical position at feed station A and is ready to receive another whole peach from feed member 350.

From the foregoing description it will be evident that the present invention provides a novel, efficient mechanism for feeding fruit to a fruit processing machine. The novel oscillating feed members, the spring-loaded drive arrangement for these members, and the fact that each feed member momentarily comes to rest at the peach-receiving position makes it possible for the operators to feed peaches rapidly without the hazard accompanying the feeding of peaches to a positive-drive, rapidly moving blade. Further, the novel transfer cup mechanism of the present invention, which is arranged to move the cups and the fruit carried therein in a straight line path toward the fruit gripping blades, quickly and accurately impales each peach on the fruit gripping blades.

It will be understood that modification and variations of the embodiment of the invention disclosed herein may be made without departing from the scope of the invention.

Having thus described the invention, what is claimed as new and is desired to be protected by Letters Patent is:

1. In a fruit preparation machine, a feed mechanism comprising a shaft mounted for oscillating movement, a support arm having an opening receiving said shaft, a spring-loaded drive connection between said shaft and said support arm, a fruit positioning member mounted on said arm, and means for oscillating said shaft, said drive connection being operable to allow oscillation of said shaft when said support arm is restrained against movement.

2. In a fruit preparation machine, an oscillatable shaft, a feed member connected to said shaft for movement therewith, means for actuating said shaft to cause oscillation thereof, a fruit positioning member mounted on said feed member and arranged to be momentarily inactive at the end of each oscillating movement of the shaft, and means connecting said feed member to said shaft for permitting oscillation of said shaft while said feed member is restrained against movement.

3. In a fruit preparation machine, a feed mechanism comprising a shaft mounted for oscillating movement, a flange keyed to said shaft, means defining a detent in said flange, a support arm having a hub receiving said shaft, a spring-loaded ball carried by said hub and having a portion of its spherical surface extending into said detent, a fruit positioning member carried on said support arm, and means for oscillating said shaft.

4. In a fruit preparation machine, a feed mechanism comprising a fixed blade, a pair of sequentially oscillating shafts on opposite sides of said blade, a support arm keyed to each shaft, a fruit carrier on each support arm, each fruit carrier being movable during oscillation of the respective support arm from a position spaced from said fixed blade to a position closely adjacent said blade and in fruit transferring relation therewith, and means for sequentially oscillating said shafts in timed relation to move said fruit carriers alternatively to fruit-transferring position adjacent said fixed blade.

5. In a fruit preparation machine, a pair of fruit gripping blades, positioning means arranged to hold and partially bisect a whole fruit at a point spaced from said blades, a pair of transfer cups movable inwardly from opposite sides of said positioning means to engage a whole fruit supported by said positioning means, and a mechanism for moving said cups to engage such whole fruit as aforesaid and for subsequently bodily rectilinearly transferring the so engaged fruit from said positioning means in engagement with said gripping blades.

6. In a fruit preparation machine, a support structure, fruit gripping blade means below said structure, fruit positioning blades mounted in aligned spaced relation to said gripping blade means, a pair of transfer cups pivotally mounted on said support structure for movement inwardly toward said fruit positioning blades to engage a whole fruit on said positioning blades, an actuator linkage slidably mounted in said support structure, cam means for reciprocating said actuator linkage, means mounting said transfer cups for movement from a position on opposite sides of said positioning blades to a position on opposite sides of said fruit gripping blade means, and means operatively connecting said cup mounting means and said actuator linkage whereby reciprocation of said linkage causes movement of said transfer cups.

7. In a fruit preparation machinne, a support structure, fruit gripping blades mounted below said support structure, fruit positioning blades mounted in aligned spaced relation to said gripping blades, a pair of shafts mounted adjacent said positioning blades, a transfer cup pivotally and slidably mounted on each shaft, an actuating bar movable into engagement with said cups for pivoting said cups from a position spaced laterally from said positioning blades to a position adjacent said positioning blades to enage a fruit held by said positioning blades, an actuating linkage operatively connected to said cups and arranged to slide said cups along said shafts from a position on opposite sides of said positioning blades to a fruit transfer position on opposite sides of said gripping blades, and cam means associated with said cup actuating linkage and said cup actuating bar for consecutively pivoting said cups into engagement with a fruit on said positioning blades and then moving said cups to fruit transfer position on opposite sides of said gripping blades.

8. In a fruit preparation machine, a pair of coplanar fruit gripping blades, a pair of coplanar impaling members in alignment with said coplanar blades and arranged to hold a peach in fixed spaced relation to said gripping blades, a pair of spaced parallel rods disposed above said blades and above said impaling members and extending in a direction parallel to the plane of said blades, a pair of carrier members, each member having a pair of spaced hubs slidably disposed on one of said rods, a transfer cup secured to each carrier member, a pusher means having an actuating member disposed on each rod between the spaced hubs thereon, and means for reciprocating said actuating members through a predetermined range of movement to cause said actuating members to engage and reciprocate said carrier members on said rods to move said cups from a position on opposite sides of said impaling members to a position on opposite sides of said gripping blades.

9. An apparatus for initially conditioning a fruit for preparation comprising, means for partially bisecting and transferring such fruit in a predetermined orientation, an indexible mechanism having a plurality of gripping blade means co-operable to receive such fruit from said bisecting and transferring means, said bisecting and transferring means and said indexible mechanism being operable in timed relation to allow transferral of such fruit therefrom to each of said plurality of gripping blade means, and selectively operable means on said bisecting and transferring means for interrupting operation thereof without affecting operation of said indexible mechanism.

References Cited in the file of this patent

UNITED STATES PATENTS

| | | |
|---|---|---|
| 1,498,078 | Duncan | June 17, 1924 |
| 2,969,867 | McClelland | Jan. 31, 1961 |